(12) United States Patent
Mori et al.

(10) Patent No.: US 9,472,825 B2
(45) Date of Patent: Oct. 18, 2016

(54) LAMINATION DEVICE AND LAMINATION METHOD

(71) Applicant: Nikkiso Co., Ltd., Tokyo (JP)

(72) Inventors: Takahiro Mori, Higashimurayama (JP); Tomoyo Sawada, Higashimurayama (JP)

(73) Assignee: Nikkiso Co., Ltd., Tokyo (JP)

( * ) Notice: Subject to any disclaimer, the term of this patent is extended or adjusted under 35 U.S.C. 154(b) by 56 days.

(21) Appl. No.: 14/356,106

(22) PCT Filed: Jun. 14, 2013

(86) PCT No.: PCT/JP2013/066455
§ 371 (c)(1),
(2) Date: May 2, 2014

(87) PCT Pub. No.: WO2014/188607
PCT Pub. Date: Nov. 27, 2014

(65) Prior Publication Data
US 2015/0069109 A1    Mar. 12, 2015

(30) Foreign Application Priority Data

May 21, 2013  (JP) .................................. 2013-106769

(51) Int. Cl.
*B32B 37/18* (2006.01)
*H01M 10/04* (2006.01)
*H01M 10/0585* (2010.01)
*B32B 38/00* (2006.01)
*H01M 10/0525* (2010.01)

(52) U.S. Cl.
CPC .......... *H01M 10/0413* (2013.01); *B32B 37/18* (2013.01); *B32B 38/0008* (2013.01); *H01M 10/0404* (2013.01); *H01M 10/0436* (2013.01); *H01M 10/0525* (2013.01); *H01M 10/0585* (2013.01); *B32B 2457/10* (2013.01); *Y02E 60/122* (2013.01)

(58) Field of Classification Search
None
See application file for complete search history.

(56) References Cited

U.S. PATENT DOCUMENTS

| 7,618,736 | B2 * | 11/2009 | Shen ..................... H01M 2/266 429/161 |
| 2005/0061426 | A1 * | 3/2005 | Parker .................. B32B 37/003 156/264 |
| 2005/0245884 | A1 * | 11/2005 | Deininger .......... B29C 45/0046 604/247 |
| 2007/0117008 | A1 * | 5/2007 | Kaneko ............... H01M 2/1653 429/152 |

(Continued)

FOREIGN PATENT DOCUMENTS

| EP | 2696421 A1 | 2/2014 |
| JP | 2000-294450 A | 10/2000 |

(Continued)

OTHER PUBLICATIONS

European Search Report corresponding to co-pending European Patent Application Serial No. 13844590.3, European Patent Office, dated Jun. 1, 2015; (7 pages).

*Primary Examiner* — Devang R Patel
(74) *Attorney, Agent, or Firm* — Nixon Peabody LLP

(57) ABSTRACT

A lamination device 30 includes a first charger 40 for emitting charged particles toward an uppermost surface of a battery stack 10 of a positive electrode sheet 12, a negative electrode sheet 14, and a separator sheet 16 that are stacked on a stacking stage 32. As a result of the emission of charged particles, the battery stack 10 and one of a positive electrode sheet 12, a negative electrode sheet 14, and a separator sheet 16 that is to be stacked on the stack 10 are electrostatically attracted to each other.

11 Claims, 11 Drawing Sheets

(56) References Cited

U.S. PATENT DOCUMENTS

| | | | | |
|---|---|---|---|---|
| 2008/0305398 A1* | 12/2008 | Komiya | ................ | H01M 6/005 429/246 |
| 2010/0178139 A1* | 7/2010 | Sundar | ................ | H01L 21/6831 414/225.01 |
| 2014/0026398 A1* | 1/2014 | Watanabe | ............... | B32B 38/18 29/623.1 |
| 2015/0020380 A1* | 1/2015 | Yamaura | ........... | H01M 10/0404 29/623.1 |

FOREIGN PATENT DOCUMENTS

| | | |
|---|---|---|
| JP | 2005-050583 A | 2/2005 |
| JP | 2005-285583 A | 10/2005 |
| JP | 2008-204706 A | 9/2008 |
| JP | 2008-246716 A | 10/2008 |
| JP | 2010-001146 A | 1/2010 |
| JP | 2012-069765 A | 4/2012 |
| JP | 5588579 B1 | 9/2014 |
| WO | 2014/188607 A1 | 11/2014 |

\* cited by examiner

LAMINATION DEVICE AND LAMINATION METHOD

CROSS-REFERENCE TO RELATED APPLICATIONS

This application is a U.S. National Stage of International Application No. PCT/JP2013/066455, entitled "Lamination Device and Lamination Method," filed Jun. 14, 2013, which claims the benefit of Japanese Patent Application No. 2013-106769, filed May 21, 2013, both of which are incorporated herein by reference in their entireties.

TECHNICAL FIELD

The present invention relates to a lamination device and a lamination method for a battery stack.

BACKGROUND ART

Electrode structures of, for example, conventionally manufactured lithium ion secondary batteries, are of two types, a wound type and a laminated type. The latter is produced by stacking negative electrodes, positive electrodes, and separators with each separator composed of an insulator being interposed between a negative electrode and a positive electrode in a manner such that, for example, a negative electrode, a separator, a positive electrode, a separator, and so on are stacked, in that order.

A positional deviation occurring between positive electrodes, negative electrodes, and separators during lamination of these components may cause a short circuit between a positive electrode and a negative electrode. To prevent a positional deviation from occurring when positive electrodes, negative electrodes, and separators are being laminated, a temporary fastener has conventionally been provided. For example, Patent Document 1 discloses providing a plurality of guide members extending in a vertical direction on a stacking stage to prevent positional deviation in a battery stack including a positive electrode, a negative electrode, and a separator.

Further, Patent Document 2 discloses a ceramic green sheet lamination process wherein a stack of green sheets are temporarily fastened using electrostatic attraction. Specifically, when green sheets are being carried, negative ions are emitted from an ionizer toward an exposed surface of a first ceramic green sheet on which a second ceramic green sheet is to be laminated, so that the surface of the first ceramic green sheet is negatively charged. Also, a surface of the second ceramic green sheet is positively charged by emission of positive ions. The charged surfaces are then brought into contact with each other to temporarily fasten the green sheets in the stack.

PRIOR ART DOCUMENTS

Patent Documents

Patent Document 1: JP 2008-204706 A
Patent Document 2: JP 2012-69765 A

SUMMARY OF THE INVENTION

Problems to be Solved by the Invention

When temporary fastening is performed using a mechanical constraint such as guide members, it is difficult to adapt to changes in the size of a battery stack. Further, when a positive electrode, a negative electrode, and a separator of a battery are laminated using electrostatic attraction, because the positive electrode and the negative electrode are conductors, unlike ceramic green sheets, the electrodes that have been charged will be discharged upon contact with, for example, a conductive carrier holder, and it is difficult to maintain a sufficient electrostatic attractive force in a battery stack. To address these circumstances, an object of the present invention is to provide a lamination device and a lamination method that can adapt to changes in the size of a battery stack, and that can maintain a sufficient electrostatic attractive force in a battery stack for temporary fastening.

Means for Solving the Problems

According to one aspect of the present invention, there is provided a lamination device for laminating a conductive positive electrode sheet, a conductive negative electrode sheet, and an insulating separator sheet for, for example, a lithium ion secondary battery, the separator sheet being interposed between the positive electrode sheet and the negative electrode sheet. This device includes a stacking stage on which a positive electrode sheet, a negative electrode sheet, and a separator sheet are stacked; and a first charger for emitting charged particles toward an uppermost surface of a stack of a positive electrode sheet, a negative electrode sheet, and a separator sheet that are stacked on the stacking stage, to electrostatically attract the stack and one of a positive electrode sheet, a negative electrode sheet, and a separator sheet that is to be stacked on the stack, to each other.

Further, it is preferable that the above-described lamination device according to the present invention further comprises a movement mechanism for moving the stacking stage, wherein the stacking stage is formed of a dielectric, and the first charger emits charged particles toward the stacking stage before a positive electrode sheet, a negative electrode sheet, or a separator sheet is stacked, to electrostatically attract the stack to the stacking stage to suppress positional deviation of the stack with respect to the stacking stage during movement of the stacking stage.

Further, it is preferable that the above-described lamination device according to the present invention further comprises a positive electrode line in which a positive electrode positioning table for positioning a positive electrode sheet and a positive electrode separator positioning table for positioning a separator sheet are provided; and a negative electrode line in which a negative electrode positioning table for positioning a negative electrode sheet and a negative electrode separator positioning table for positioning a separator sheet are provided, wherein the movement mechanism moves the stacking stage to the positive electrode line, and to the negative electrode line.

Further, it is preferable that the above-described lamination device according to the present invention further comprises a carrier holder for carrying a separator sheet from either the positive electrode separator positioning table or the negative electrode separator positioning table to the stacking stage, wherein the carrier holder carries the separator sheet with a lower surface that faces an uppermost surface of the stack being exposed, and the lamination device further comprises a second charger for emitting charged particles toward the lower surface of the separator sheet that is being carried.

Further, it is preferable for the above-described lamination device according to the present invention to further comprise a temporary fastener tape stage for affixing a temporary fastener tape to an outermost perimeter of the stack, wherein the movement mechanism moves the stacking stage from either the positive electrode line or the negative electrode line to the temporary fastener tape stage.

Further, it is preferable for the above-described lamination device according to the present invention to further comprise a welding stage for welding an electrode tab to each of a plurality of positive electrode terminals and a plurality of negative electrode terminals of the stack to which the temporary fastener tape is affixed.

According to another aspect of the present invention, there is provided a lamination method for laminating a conductive positive electrode sheet, a conductive negative electrode sheet, and an insulating separator sheet for, for example, a lithium ion secondary battery, the separator sheet being interposed between the positive electrode sheet and the negative electrode sheet. This method includes stacking a positive electrode sheet, a negative electrode sheet, and a separator sheet on a stacking stage; and emitting charged particles toward an uppermost surface of a stack of a positive electrode sheet, a negative electrode sheet, and a separator sheet that are stacked on the stacking stage, to electrostatically attract the stack and one of a positive electrode sheet, a negative electrode sheet, and a separator sheet that is to be stacked on the stack, to each other.

Further, it is preferable that, in the above-described lamination method according to the present invention, the stacking stage is movable, and is formed of a dielectric, and the lamination method further comprises emitting charged particles toward the stacking stage before a positive electrode sheet, a negative electrode sheet, or a separator sheet is stacked, to electrostatically attract the stack to the stacking stage to suppress positional deviation of the stack with respect to the stacking stage during movement of the stacking stage.

Further, it is preferable that the above-described lamination method according to the present invention further comprises moving the stacking stage to a positive electrode line in which a positive electrode positioning table for positioning a positive electrode sheet and a positive electrode separator positioning table for positioning a separator sheet are provided; and moving the stacking stage to a negative electrode line in which a negative electrode positioning table for positioning a negative electrode sheet and a negative electrode separator positioning table for positioning a separator sheet are provided.

Further, it is preferable that the above-described lamination method according to the present invention further comprises carrying a separator sheet from either the positive electrode separator positioning table or the negative electrode separator positioning table to the stacking stage, with a lower surface that faces an uppermost surface of the stack being exposed; and emitting charged particles toward the lower surface of the separator sheet that is being carried.

Advantages of the Invention

By employing the present invention, it is possible to adapt to changes in the size of a stack, and to maintain a sufficient electrostatic attractive force in a battery stack for temporary fastening.

EMBODIMENTS FOR CARRYING OUT THE INVENTION

Figure 1:
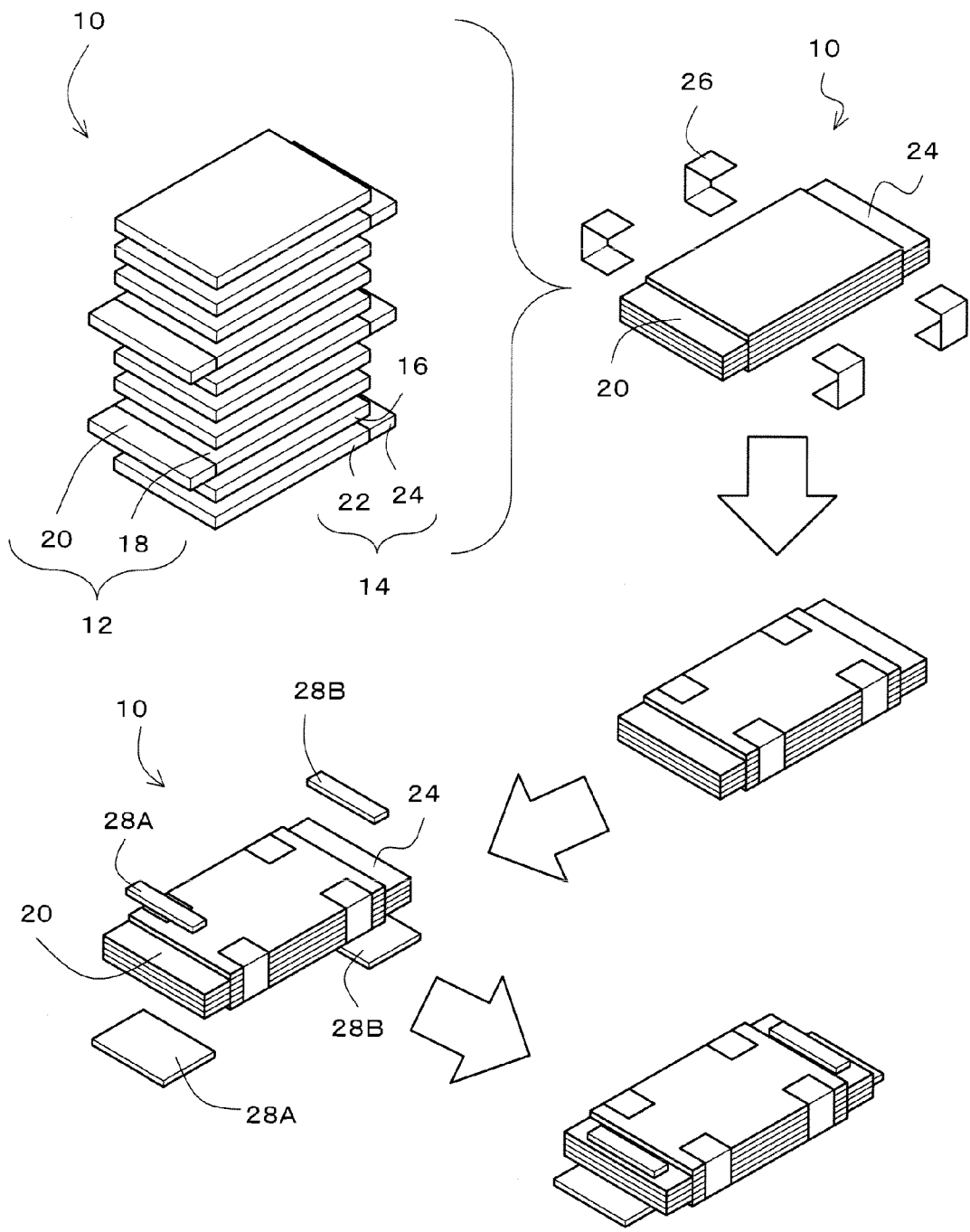
FIG. 1 illustrates a process for forming a battery stack.

FIG. 1 shows, by way of example, a battery stack 10 formed by a lamination device according to an embodiment of the present invention. The battery stack 10 includes a positive electrode sheet 12, a negative electrode sheet 14, and a separator sheet 16.

The positive electrode sheet 12 is formed by applying a positive electrode active material layer 18 to a conductive collector sheet. The collector sheet is composed of, for example, aluminum foil. The positive electrode active material layer 18 includes a lithium composite oxide such as $LiCoO_2$, and a binder for fixing the lithium composite oxide to the collector sheet. A portion of the collector sheet is exposed without the positive electrode active material layer 18 being formed thereon, and this portion serves as a positive electrode terminal 20.

The negative electrode sheet 14 is formed by applying a negative electrode active material layer 22 to a conductive collector sheet. The collector sheet is composed of, for example, copper foil. The negative electrode active material layer 22 includes a carbonaceous material such as carbon, and a binder for fixing the carbonaceous material to the collector. A portion of the collector sheet is exposed without the negative electrode active material layer 22 being formed thereon, and this portion serves as a negative electrode terminal 24. The negative electrode sheet 14 may be formed to be approximately the same size as the positive electrode sheet 12.

The separator sheet 16 is interposed between and insulates the positive electrode sheet 12 and the negative electrode sheet 14 from each other. The separator sheet 16 is composed of an insulating porous film of polypropylene, polyethylene, or the like. The separator sheet 16 may be any size that can cover the active material layers of the positive electrode sheet 12 and the negative electrode sheet 14, and may be, for example, approximately the same shape as the active material layers.

In the battery stack 10, a separator sheet 16 is interposed between a negative electrode sheet 14 and a positive electrode sheet 12, and a plurality of sets of these three types of layers are stacked. For example, when it is assumed that one set of layers is composed of a negative electrode sheet 14, a separator sheet 16, a positive electrode sheet 12, and a separator sheet 16 that are stacked in that order, the battery stack 10 is formed by stacking roughly 10 to 50 sets of layers. During the stacking, layers are stacked so as to avoid the positive electrode terminal 20 of the positive electrode sheet 12 and the negative electrode terminal 24 of the negative electrode sheet 14 from overlapping each other. For example, the positive electrode terminal 20 is arranged at one end, and the negative electrode terminal 24 is arranged at another, opposite end.

After the stacking for the battery stack 10 has been completed, a temporary fastener tape 26 is affixed to an outermost perimeter of the battery stack 10. In the battery stack 10 to which the temporary fastener tape 26 is affixed, electrode tabs 28 are welded to a plurality of positive electrode terminals 20 and a plurality of negative electrode terminals 24. The electrode tabs 28 fix the plurality of positive electrode terminals 20 to each other, and fix the plurality of negative electrode terminals 24 to each other by welding, so that the layers of the battery stack 10 are fastened. Electrode tabs 28A for the positive electrode terminals 20 are composed of, for example, aluminum, and electrode tabs 28B for the negative electrode terminals 24 are composed of, for example, nickel.

Figure 2:
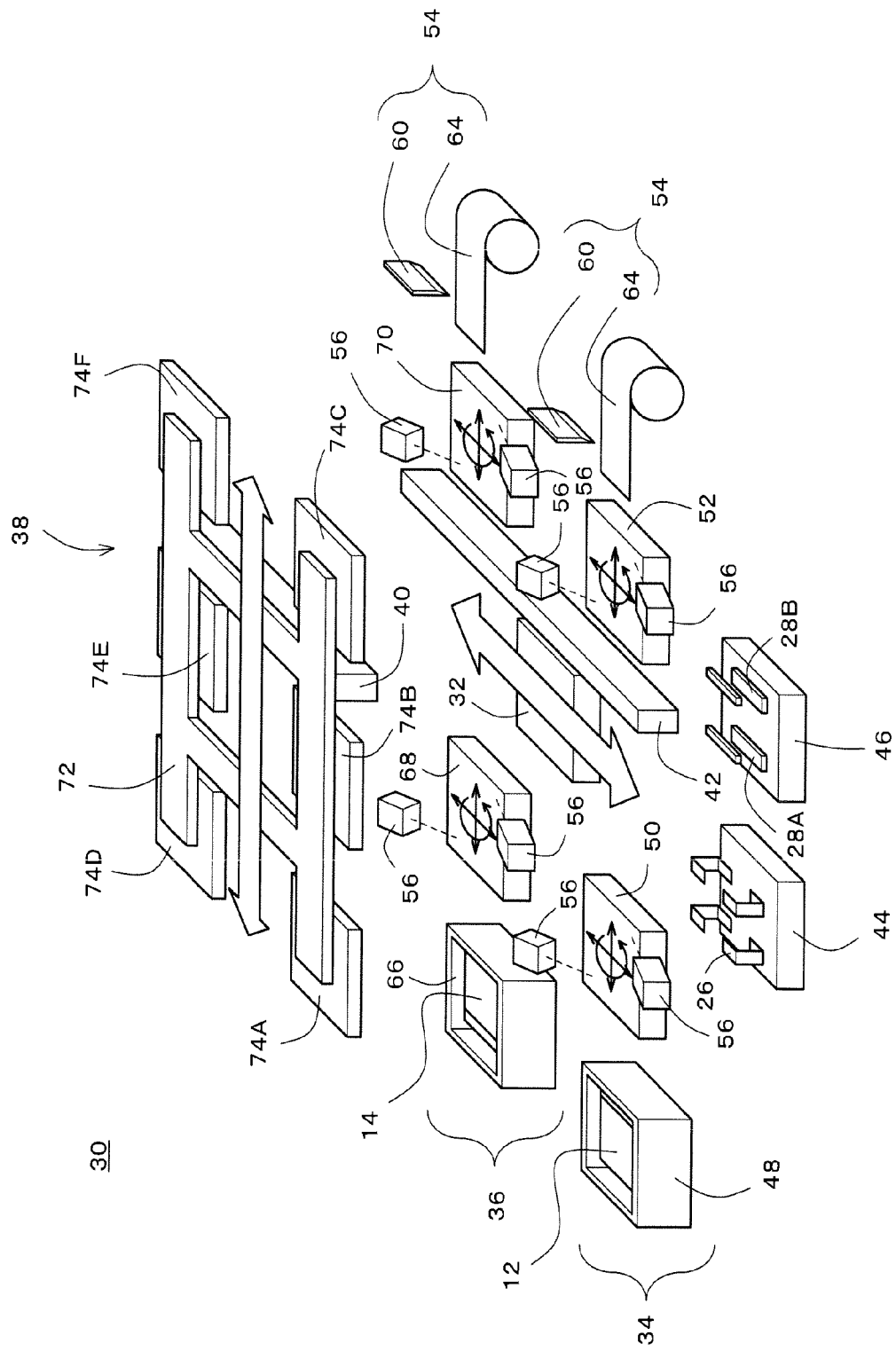
FIG. 2 shows, by way of example, a lamination device for a battery stack according to an embodiment of the present invention.

FIG. 2 shows, by way of example, a lamination device 30 for the battery stack 10 according to an embodiment of the present invention. The lamination device 30 includes a stacking stage 32, a positive electrode line 34, a negative electrode line 36, a carrier holder 38, a first charger 40, a second charger 42, a temporary fastener tape stage 44, and a welding stage 46.

The positive electrode line 34 is a process line for stacking a positive electrode sheet 12 and a separator sheet 16. The positive electrode line 34 includes a positive electrode cassette 48, a positive electrode positioning table 50, a positive electrode separator positioning table 52, and a separator sheet feeder 54. In the positive electrode line 34, for example, the positive electrode cassette 48, the positive electrode positioning table 50, the positive electrode separator positioning table 52, and the separator sheet feeder 54 are arranged in a line. The positive electrode positioning table 50 and the positive electrode separator positioning table 52 are spaced away from each other such that the stacking stage 32 and the second charger 42 can be arranged between them.

The positive electrode cassette 48 is a housing for housing a plurality of positive electrode sheets 12. The positive electrode positioning table 50 is an aligner for aligning a positive electrode sheet 12. The positive electrode positioning table 50 is capable of moving and rotating in two perpendicular directions, and in a rotational direction about an axis of rotation perpendicular to these two directions. The positive electrode positioning table 50 has a retainer for retaining a positive electrode sheet 12 that is placed on the positive electrode positioning table 50. The retainer may be, for example, a vacuum chuck implemented by vacuum attraction.

The positive electrode positioning table 50 has a detector 56 for detecting the position of the positive electrode sheet 12 on the positive electrode positioning table 50. The detector 56 may be, for example, an image capturing device such as a camera. The detector 56 detects differences of the position and the posture of the positive electrode sheet 12 from a predetermined position or posture with reference to a predetermined mark, such as a corner of the positive electrode sheet 12. The positive electrode positioning table 50 moves or rotates to correct for the differences.

In the following description, adjustments to the position and the posture of a positive electrode sheet 12, a negative electrode sheet 14, or a separator sheet 16 are simply referred to as "alignment".

The positive electrode separator positioning table 52 is an aligner for aligning a separator sheet 16. The positive electrode separator positioning table 52 is capable of moving and rotating in two perpendicular directions, and in a rotational direction about an axis of rotation perpendicular to these two directions, as with the positive electrode positioning table 50. The positive electrode separator positioning table 52 has a retainer, such as a vacuum chuck, for retaining a separator sheet 16 that is placed on the positive electrode separator positioning table 52. The positive electrode separator positioning table 52 further has a detector 56 for detecting the position of the separator sheet 16 on the positive electrode separator positioning table 52. In order that the separator sheet 16 may be in a predetermined position or posture, the positive electrode separator positioning table 52 moves or rotates in accordance with a result of detection from the detector 56.

The separator sheet feeder 54 includes a separator sheet cutter 60 and a sheet roll 64. The separator sheet cutter 60 cuts the sheet roll 64 composed of a wound continuous separator sheet into predetermined lengths. Separator sheets 16 into which the sheet roll 64 has been cut are carried to the positive electrode separator positioning table 52 by a carrier which is not shown.

The negative electrode line 36 is a process line for stacking a negative electrode sheet 14 and a separator sheet 16. The negative electrode line 36 includes a negative electrode cassette 66, a negative electrode positioning table 68, a negative electrode separator positioning table 70, and a separator sheet feeder 54. In the negative electrode line 36, the negative electrode cassette 66, the negative electrode positioning table 68, the negative electrode separator positioning table 70, and the separator sheet feeder 54 are arranged in a line, as with the positive electrode line 34. The negative electrode positioning table 68 and the negative electrode separator positioning table 70 are spaced away from each other such that the stacking stage 32 and the second charger 42 can be arranged between them. The negative electrode line 36 is provided in parallel with the positive electrode line 34.

The negative electrode cassette 66 is a housing for housing a plurality of negative electrode sheets 14. The negative electrode positioning table 68 is an aligner for aligning a negative electrode sheet 14. The negative electrode positioning table 68 has a retainer, such as a vacuum chuck, for retaining a negative electrode sheet 14 that is placed on the negative electrode positioning table 68, as with the positive electrode positioning table 50. The negative electrode positioning table 68 is capable of moving and rotating in two perpendicular directions, and in a rotational direction about an axis of rotation perpendicular to these two directions. The negative electrode positioning table 68 has a detector 56 for detecting the position of the negative electrode sheet 14 on the negative electrode positioning table 68. In order to be able to arrange the negative electrode sheet 14 in a predetermined position or posture, the negative electrode positioning table 68 moves or rotates in accordance with a result of detection from the detector 56.

The negative electrode separator positioning table 70 is an aligner for aligning a separator sheet 16. The negative electrode separator positioning table 70 has a retainer, such as a vacuum chuck, for retaining a separator sheet 16 that is placed on the negative electrode separator positioning table 70, as with the positive electrode separator positioning table 52. The negative electrode separator positioning table 70 is capable of moving and rotating in two perpendicular directions, and in a rotational direction about an axis of rotation perpendicular to these two directions. The negative electrode separator positioning table 70 has a detector 56 for detecting the position of the separator sheet 16 on the negative electrode separator positioning table 70. In order to be able to arrange the separator sheet 16 in a predetermined position or posture, the negative electrode separator positioning table 70 moves or rotates in accordance with a result of detection from the detector 56.

In the temporary fastener tape stage 44, a temporary fastener tape 26 is affixed to an outermost perimeter of the battery stack 10 for which the stacking has been completed. In the welding stage 46, electrode tabs 28A and 28B are respectively welded to a plurality of positive electrode terminals 20 and a plurality of negative electrode terminals 24 of the battery stack 10 to which the temporary fastener tape 26 is affixed, using welding means such as ultrasonic welding or resistance welding. As a result of the welding of the electrode tabs 28A and 28B, the layers of the battery stack 10 are fastened.

By incorporating the welding stage 46 in the lamination device 30 as described above, compared with a structure wherein they are separate devices, the time required for a process from the stacking to the fastening of the layers of the battery stack 10 can be shortened. As will be described below, the temporary fastening of the battery stack 10 according to the present embodiment is performed by electrostatic attraction, and the attractive force gradually decreases over time due to discharge. By shortening the period of time from the charging of the sheets of the battery stack 10 until the fastening, as in the present embodiment, the layers of the battery stack 10 can be fastened before the temporary fastening becomes unstable as the attractive force decreases.

The carrier holder 38 carries positive electrode sheets 12, negative electrode sheets 14, and separator sheets 16. The carrier holder 38 includes a movement mechanism 72 and a retainer 74. The movement mechanism 72 may be, for example, a linear movement that linearly moves along a direction in which the positive electrode line 34 and the negative electrode line 36 extend.

The retainer 74 may be, for example, a vacuum chuck that uses vacuum attraction. To release positive electrode sheets 12, negative electrode sheets 14, and separator sheets 16 from the retainer 74, the retainer 74 may include a mechanism for venting pressurized gas, or a static eliminator.

Further, the retainer 74 may comprise a plurality of retainers. For example, the retainer 74 includes a retainer 74A for carrying a positive electrode sheet 12 from the positive electrode cassette 48 to the positive electrode positioning table 50, a retainer 74B for carrying the positive electrode sheet 12 from the positive electrode positioning table 50 to the stacking stage 32, and a retainer 74C for carrying a separator sheet 16 from the positive electrode separator positioning table 52 to the stacking stage 32. The retainers 74A, 74B, and 74C are arranged in a line along, for example, the direction of movement of the carrier holder 38. It is preferable that the retainers 74A, 74B, and 74C be arranged at intervals respectively equal to intervals at which the positive electrode cassette 48, the positive electrode positioning table 50, and the stacking stage 32 are arranged. For example, it is preferable that the retainers 74A, 74B, and 74C be arranged at regular intervals.

Also, the retainer 74 includes a retainer 74D for carrying a negative electrode sheet 14 from the negative electrode cassette 66 to the negative electrode positioning table 68, a retainer 74E for carrying the negative electrode sheet 14 from the negative electrode positioning table 68 to the stacking stage 32, and a retainer 74F for carrying a separator sheet 16 from the negative electrode separator positioning table 70 to the stacking stage 32. The retainers 74D, 74E, and 74F are arranged in a line along, for example, the direction of movement of the carrier holder 38 in parallel with the retainers 74A, 74B, and 74C. It is preferable that the retainers 74D, 74E, and 74F be arranged at intervals respectively equal to intervals at which the negative electrode cassette 66, the negative electrode positioning table 68, and the stacking stage 32 are arranged. For example, it is preferable that the retainers 74D, 74E, and 74F be arranged at regular intervals.

Each of the retainers 74A to 74F is provided with a lift mechanism that can move in a vertical direction. The retainers 74A to 74F move downward in the vertical direction to come into contact with a positive electrode sheet 12, a negative electrode sheet 14, and separator sheets 16 that are placed on, for example, the positioning tables, and then retain these sheets by, for example, vacuum attraction. The retainers 74 that have retained the sheets move back upward in the vertical direction, and then the movement mechanism. 72 moves the carrier holder 38. During the movement, lower surfaces of the retained sheets that face an uppermost surface of the battery stack 10 are exposed. After the movement, the retainers 74 move downward in the vertical direction to come into contact with a destination positioning table or an uppermost layer of the battery stack 10 on the stacking stage 32, and then the sheets are released by canceling the vacuum, and optionally venting pressurized gas.

On the stacking stage 32, positive electrode sheets 12, negative electrode sheets 14, and separator sheets 16 are stacked. The stacking stage 32 is movable by a movement mechanism which is not shown. The movement mechanism moves the stacking stage 32 to the positive electrode line 34, the negative electrode line 36, and the temporary fastener tape stage 44. The stacking stage 32 may move in a direction approximately perpendicular to the direction in which the positive electrode line 34 and the negative electrode line 36 extend.

It is preferable that the stacking stage 32 be composed of a dielectric. For example, it is preferable that the stacking stage 32 be composed of a silicone-based material such as silicone rubber.

It is preferable that the positive electrode cassette 48, the positive electrode positioning table 50, the stacking stage 32, and the positive electrode separator positioning table 52 be arranged at regular intervals. Similarly, it is preferable that the negative electrode cassette 66, the negative electrode positioning table 68, the stacking stage 32, and the negative electrode separator positioning table 70 be arranged at regular intervals.

The first charger 40 emits charged particles toward the stacking stage 32. The first charger 40 may be, for example, an ionizer. To emit negative ions, a voltage of preferably −100 kV to −10 kV, or more preferably −50 kV is applied to the first charger 40. To emit positive ions, a voltage of preferably +10 kV to +50 kV, or more preferably +30 kV is applied to the first charger 40.

The first charger 40 may be provided on the carrier holder 38. The first charger 40 emits charged particles while traversing the stacking stage 32 in conjunction with the movement of the carrier holder 38, so that the stacking stage 32 can be charged over a two-dimensional area. The first charger 40 may have an elongated shape extending in a direction perpendicular to the direction in which the positive electrode line 34 and the negative electrode line 36 extend, and may be provided between the retainers 74B and 74C, and between the retainers 74E and 74F. Charged particles may be emitted downward in the vertical direction.

The second charger 42 emits charged particles toward lower surfaces (the surfaces that face an uppermost surface of the battery stack 10) of separator sheets 16 that are carried from the positive electrode separator and negative electrode separator positioning tables 52 and 70 to the stacking stage 32. The second charger 42 may have an elongated shape extending in a direction perpendicular to the direction in which the positive electrode line 34 and the negative electrode line 36 extend, and may be provided between the positive electrode separator positioning table 52 and the stacking stage 32, and between the negative electrode separator positioning table 70 and the stacking stage 32. Charged particles may be emitted upward in the vertical direction.

The second charger 42 may be, for example, an ionizer. To emit negative ions, a voltage of preferably −100 kV to −10 kV, or more preferably −50 kV is applied to the second charger 42, as with the first charger 40. To emit positive ions, a voltage of preferably +10 kV to +50 kV, or more preferably +30 kV is applied to the second charger 42. As a result of experiments, the inventors of the present invention have found that it is more difficult to release a separator sheet 16 from the carrier holder 38 when positive ions are emitted than when negative ions are emitted. Based on the above findings, it is preferable for the second charger 42 to be configured to emit negative ions.

Figure 3:
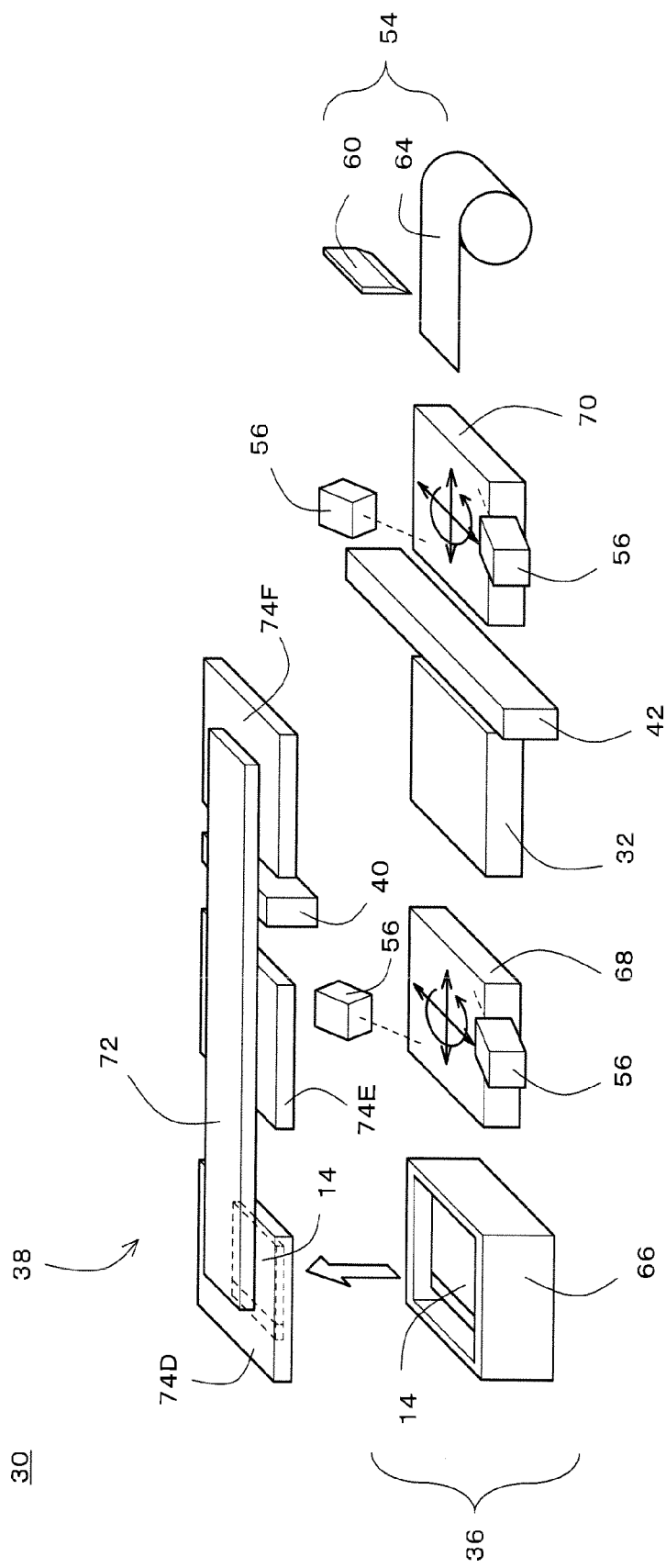
FIG. 3 illustrates a step in a battery stack lamination process that uses the lamination device according to the embodiment of the present invention.

Next, a lamination process of a battery stack 10 that uses a lamination device 30 according to an embodiment of the present invention will be described below. FIG. 3 illustrates an initial state of the lamination process. It should be noted that FIGS. 3 to 11 illustrate the lamination process for the negative electrode line 36, and for simplicity, do not show the positive electrode line 34 and the retainers 74A to 74C.

The stacking stage 32 is stationary at the negative electrode line 36. The carrier holder 38 moves so as to position the retainer 74D above the negative electrode cassette 66. The retainer 74D then retains a negative electrode sheet 14 from the negative electrode cassette 66 by, for example, vacuum attraction.

Figure 4:
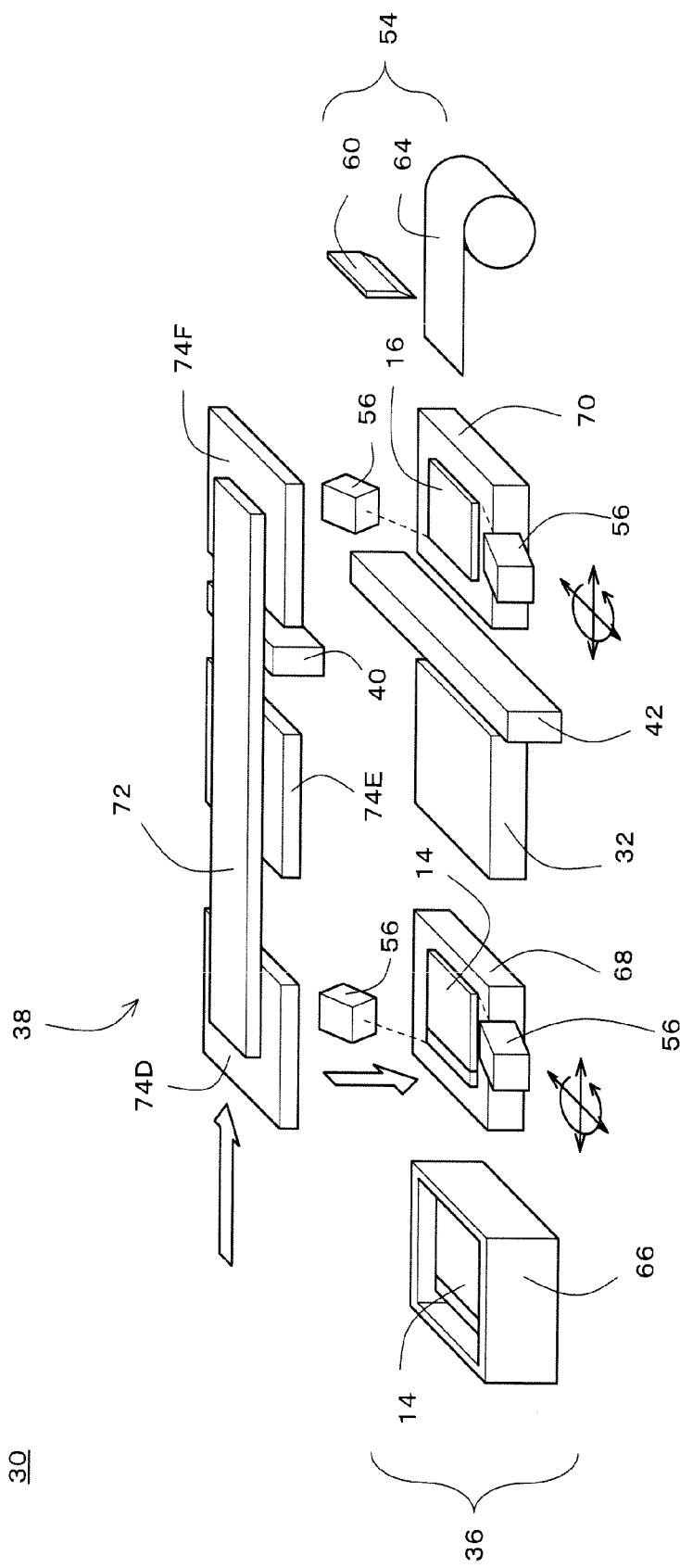
FIG. 4 illustrates a step in the battery stack lamination process that uses the lamination device according to the embodiment of the present invention.

Referring next to FIG. 4, the carrier holder 38 moves so as to position the retainer 74D above the negative electrode positioning table 68. The retainer 74D then cancels the vacuum attraction, and, for example, vents pressurized gas to release the negative electrode sheet 14, so that the negative electrode sheet 14 is placed on the negative electrode positioning table 68.

The negative electrode positioning table 68 aligns the negative electrode sheet 14 that is placed thereon. Simultaneously, in the separator sheet feeder 54, the separator sheet cutter 60 cuts the sheet roll 64 into a piece. This piece serving as a separator sheet 16 is placed on the negative electrode separator positioning table 70, and is aligned.

Figure 5:
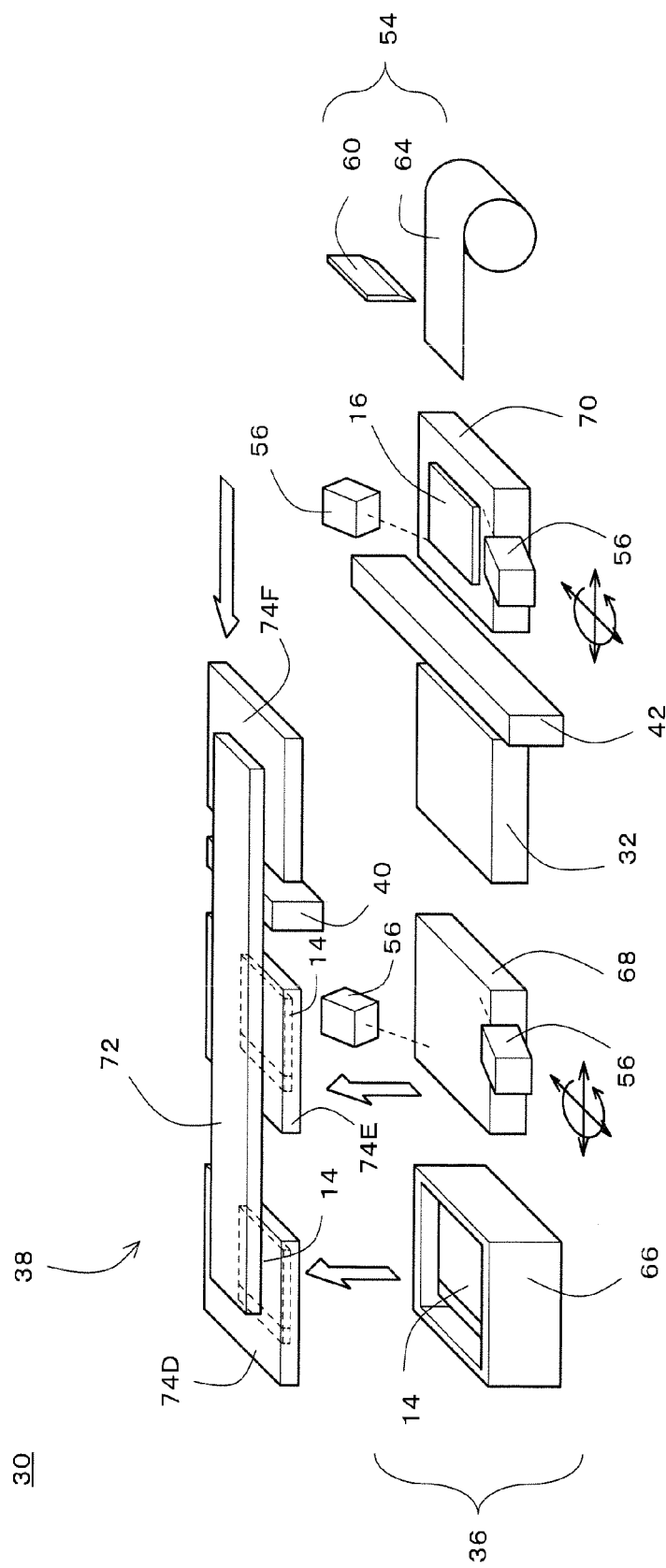
FIG. 5 illustrates a step in the battery stack lamination process that uses the lamination device according to the embodiment of the present invention.

Referring next to FIG. 5, the carrier holder 38 moves so as to position the retainer 74E above the negative electrode positioning table 68. The retainer 74E then retains the negative electrode sheet 14 that is placed on the negative electrode positioning table 68, and that has been aligned. Simultaneously, the retainer 74D also retains a negative electrode sheet 14 from the negative electrode cassette 66.

Figure 6:
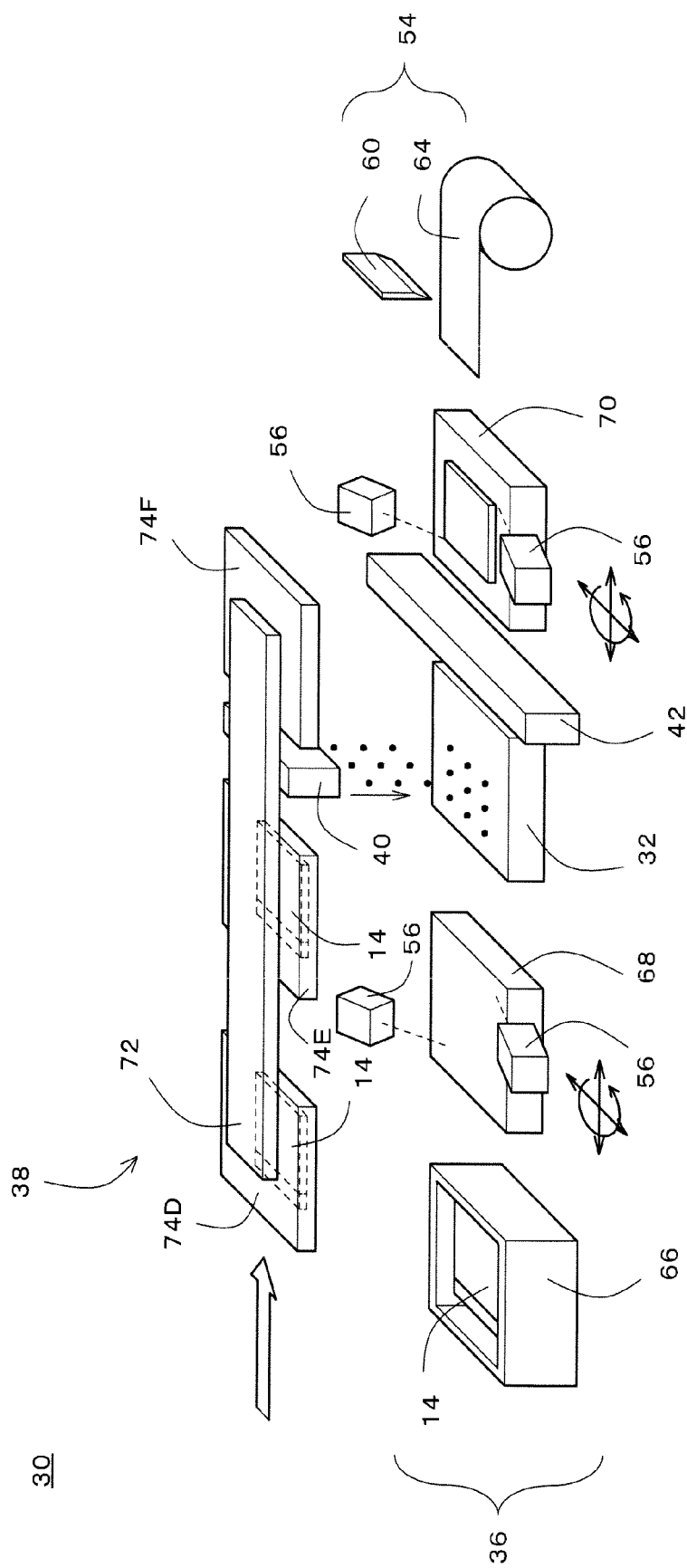
FIG. 6 illustrates a step in the battery stack lamination process that uses the lamination device according to the embodiment of the present invention.

Referring next to FIG. 6, the carrier holder 38 moves toward the separator sheet feeder 54. During this movement, the first charger 40 emits charged particles toward the stacking stage 32, which has no sheet placed on the stacking surface, to charge the stacking stage 32.

Figure 7:
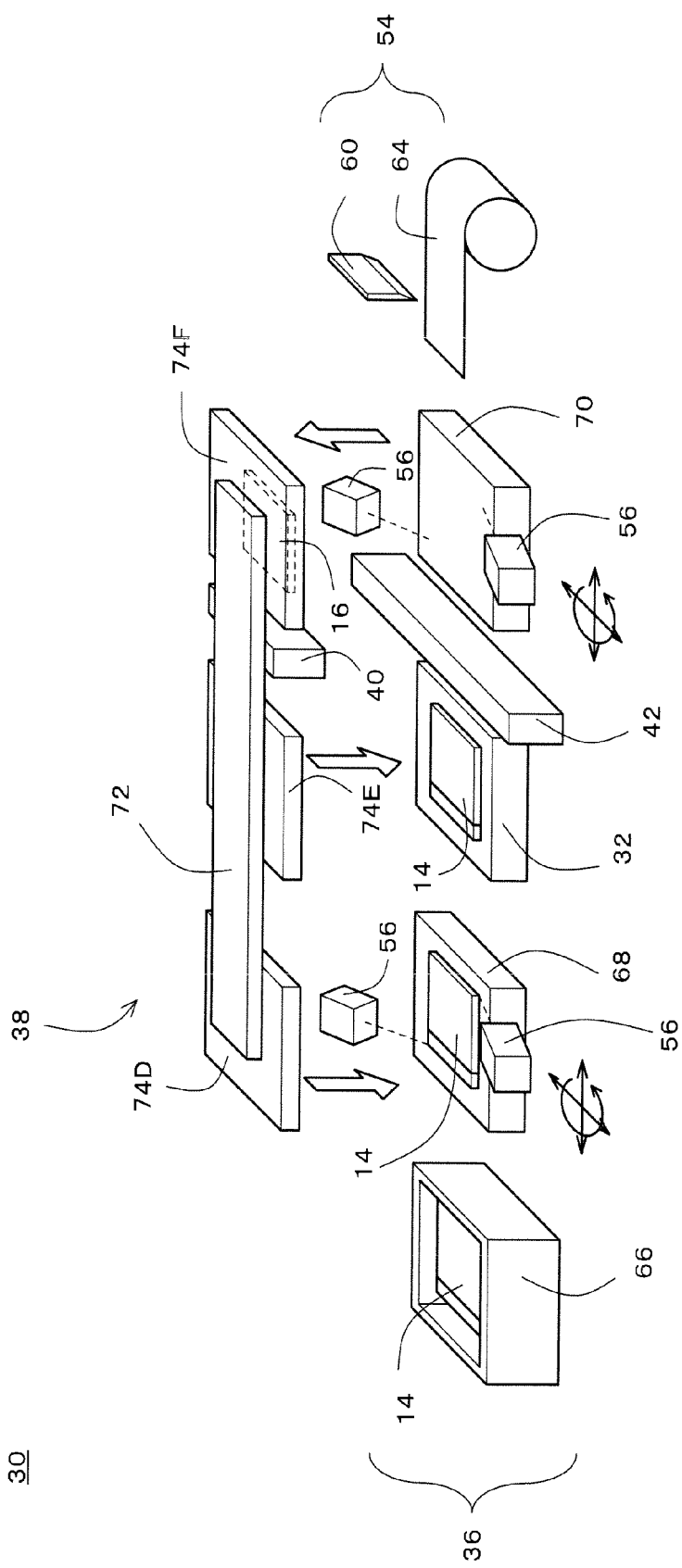
FIG. 7 illustrates a step in the battery stack lamination process that uses the lamination device according to the embodiment of the present invention.

Referring next to FIG. 7, the carrier holder 38 moves so as to position the retainer 74E above the stacking stage 32. The retainer 74E releases the negative electrode sheet 14, so that the negative electrode sheet 14 is placed on the stacking stage 32.

At this time, the charged stacking stage 32 and the negative electrode sheet 14 are temporarily fastened by electrostatic attraction. Temporarily fastening the stacking stage 32 and the negative electrode sheet 14, or in other words, the battery stack 10, suppresses positional deviation of the battery stack 10 with respect to the stacking stage 32 during the movement of the stacking stage 32.

On the other hand, the retainer 74D releases the negative electrode sheet 14, so that the negative electrode sheet 14 is placed on the negative electrode positioning table 68. The negative electrode positioning table 68 aligns the negative electrode sheet 14 that is placed thereon. Simultaneously, the retainer 74F retains a separator sheet 16 that is aligned by the negative electrode separator positioning table 70.

Figure 8:
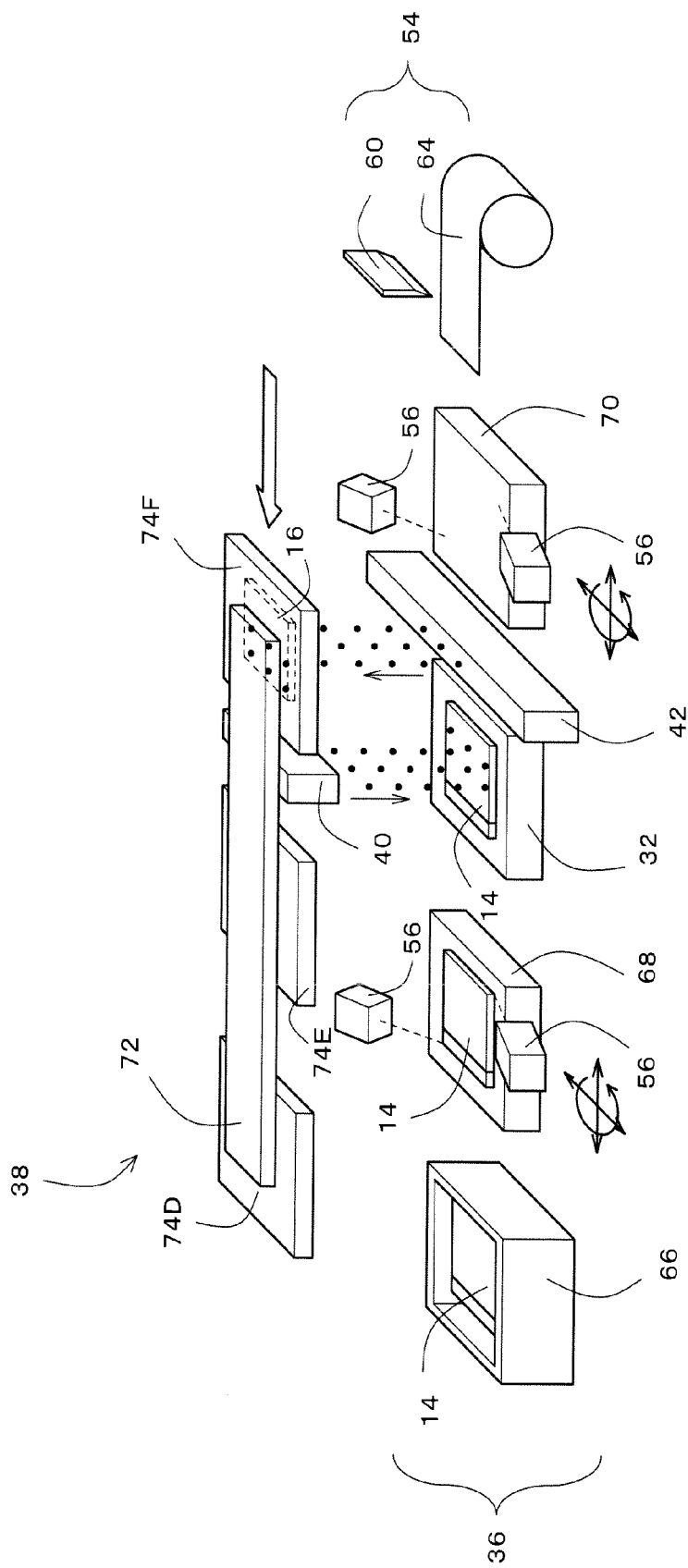
FIG. 8 illustrates a step in the battery stack lamination process that uses the lamination device according to the embodiment of the present invention.

Referring next to FIG. 8, the carrier holder 38 moves toward the negative electrode cassette 66. During this movement, the first charger 40 emits charged particles toward an upper surface of the negative electrode sheet 14 that is placed on the stacking stage 32, to charge the negative electrode sheet 14. In other words, the first charger 40 emits charged particles toward an uppermost surface of the battery stack 10 on the stacking stage 32, to charge an uppermost layer of the battery stack 10.

As described above, according to the present embodiment, the negative electrode sheet 14 and the positive electrode sheet 12 composed of conductors are charged after they are placed or stacked on the stacking stage 32. Compared with a structure that is charged while being carried, because escape of charges through a carrier is avoided, a reduction in electrostatic attractive force of the battery stack 10 can be suppressed.

Simultaneously, the second charger 42 emits charged particles toward a lower surface of the separator sheet 16 retained by the retainer 74F. As described above, because the separator sheet 16 is composed of a dielectric, the amount of charge leaking to the carrier holder 38 is very small, and the state of charge is maintained.

Figure 9:
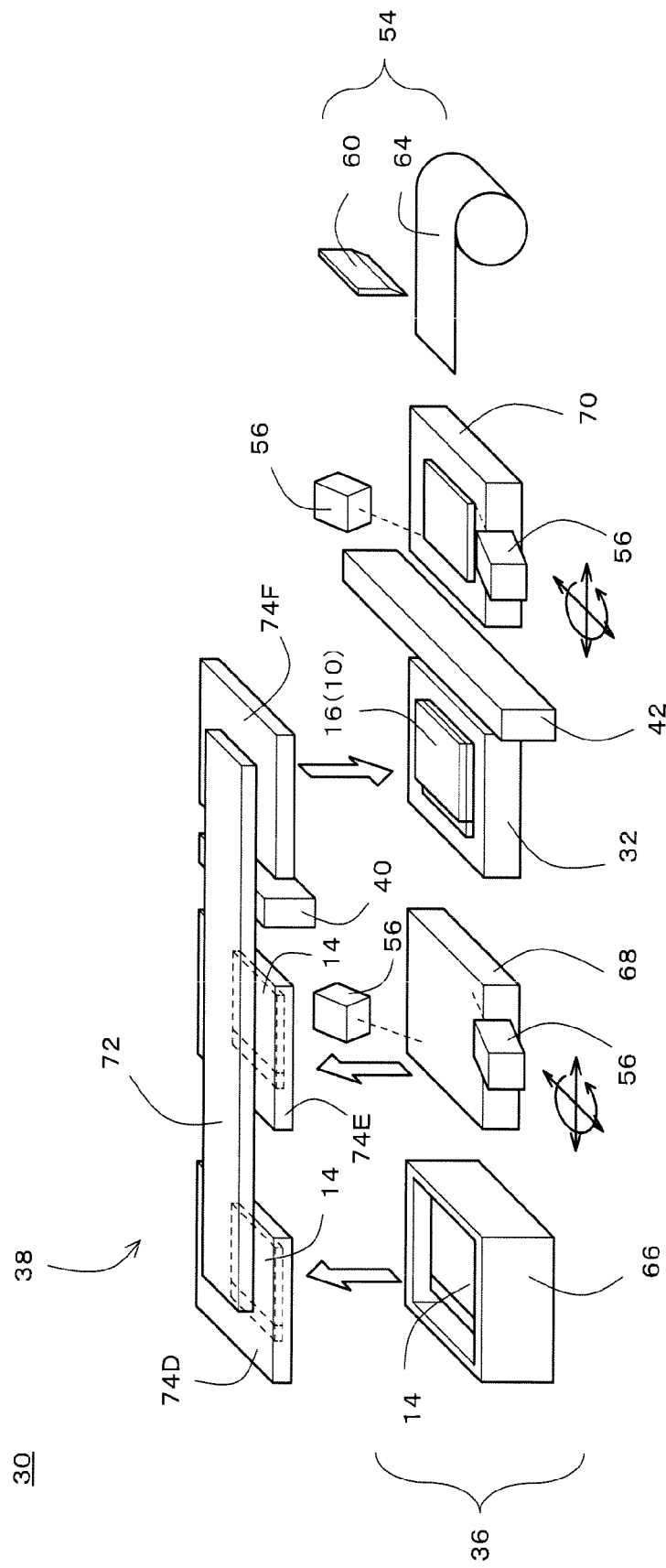
FIG. 9 illustrates a step in the battery stack lamination process that uses the lamination device according to the embodiment of the present invention.

Referring next to FIG. 9, the carrier holder 38 moves so as to position the retainer 74F above the stacking stage 32. The retainer 74F releases the separator sheet 16, so that the separator sheet 16 is stacked on the negative electrode sheet 14 on the stacking stage 32. At this time, the charged negative electrode sheet 14 and the charged separator sheet 16 are temporarily fastened by electrostatic attraction.

Simultaneously, the retainer 74E retains a negative electrode sheet 14 that is placed on the negative electrode positioning table 68, and that has been aligned. Simultaneously, the retainer 74D also retains a negative electrode sheet 14 from the negative electrode cassette 66. In the separator sheet feeder 54, the separator sheet cutter 60 cuts the sheet roll 64 into a piece. This piece serving as a separator sheet 16 is placed on the negative electrode separator positioning table 70, and is aligned.

Figure 10:
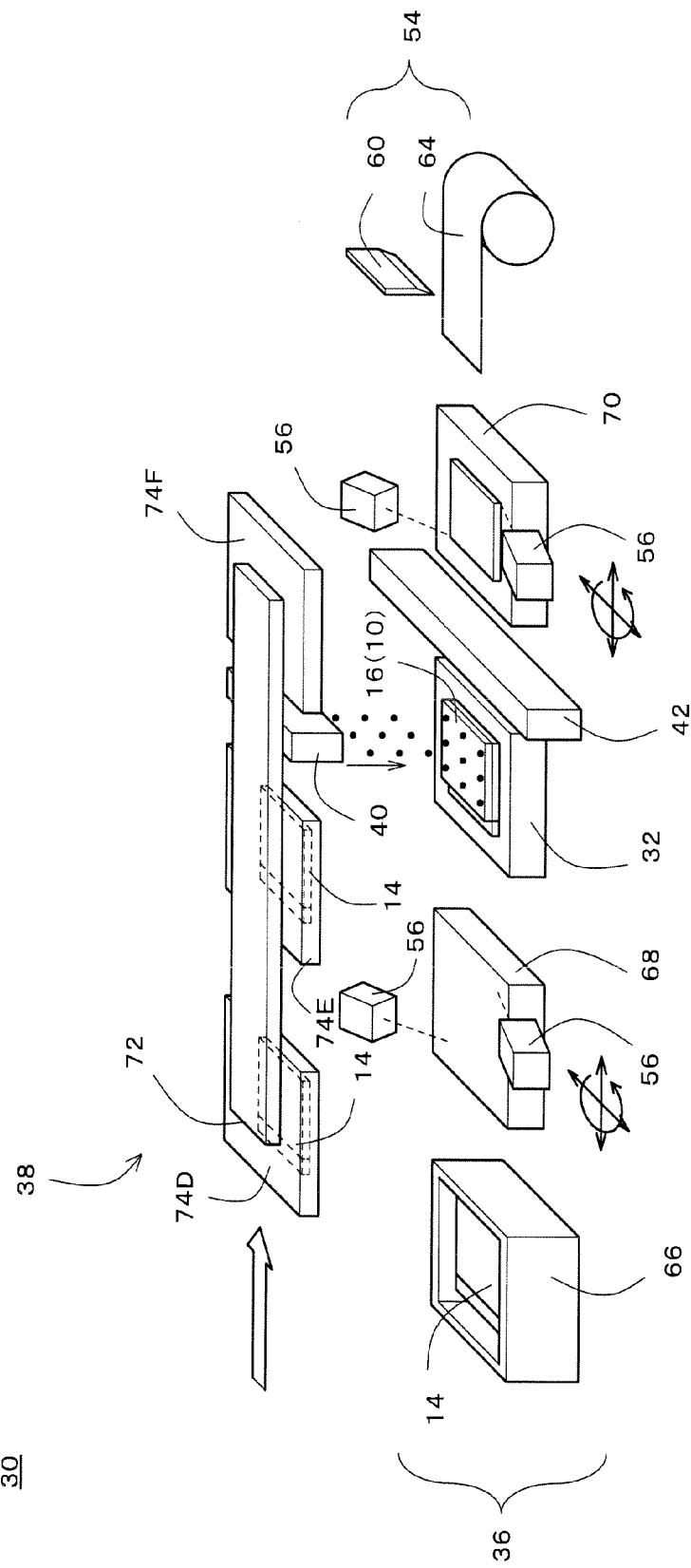
FIG. 10 illustrates a step in the battery stack lamination process that uses the lamination device according to the embodiment of the present invention.

Referring next to FIG. 10, the carrier holder 38 moves toward the separator sheet feeder 54. During this movement, the first charger 40 emits charged particles toward an uppermost surface of the battery stack 10 on the stacking stage 32 (an upper surface of the separator sheet 16), to charge the upper layer separator sheet 16.

Figure 11:
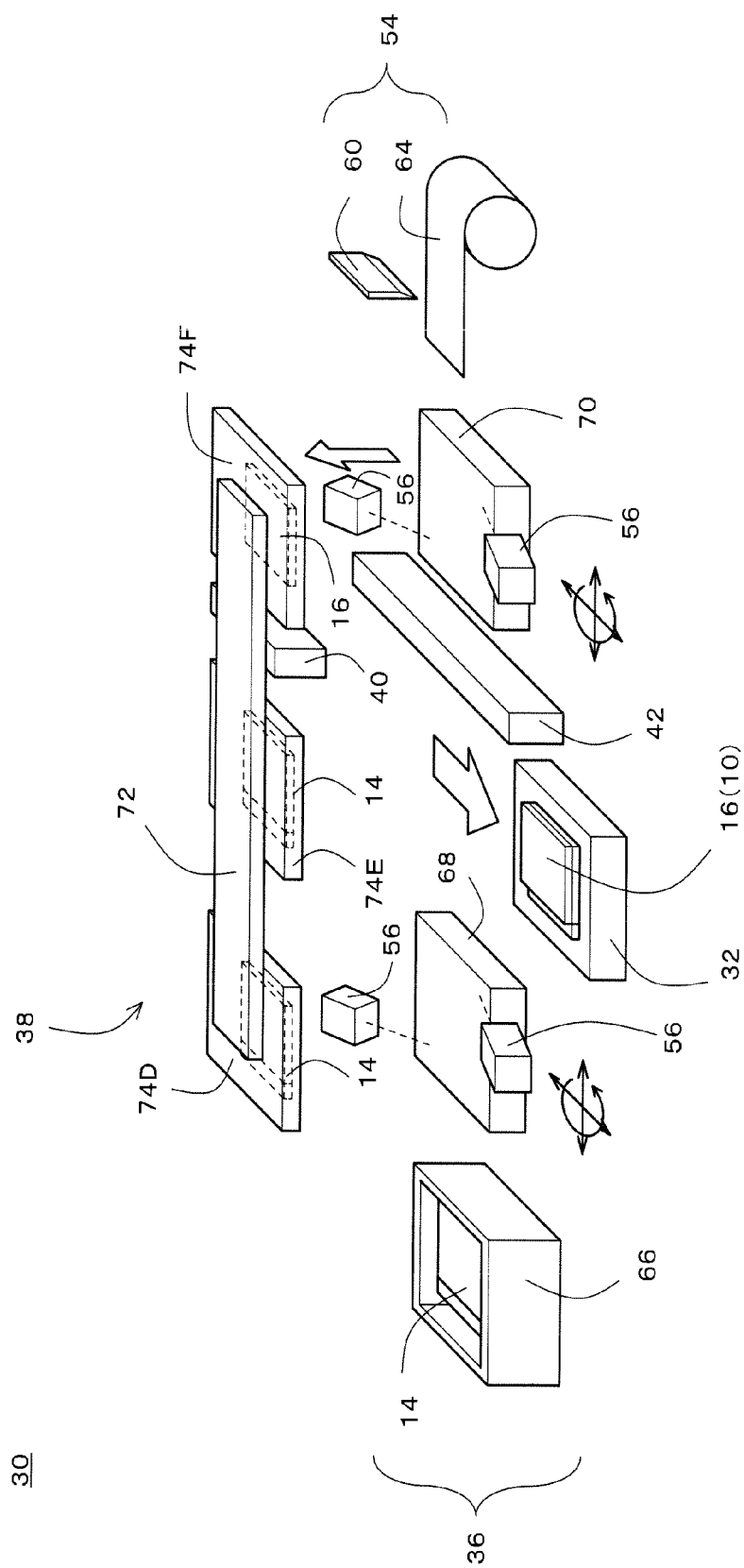
FIG. 11 illustrates a step in the battery stack lamination process that uses the lamination device according to the embodiment of the present invention.

Referring next to FIG. 11, the carrier holder 38 moves so as to position the retainer 74F above the negative electrode separator positioning table 70, and the retainer 74F retains a separator sheet 16 that is aligned by the negative electrode separator positioning table 70.

At this time, the stacking stage 32 moves to the positive electrode line 34. In the positive electrode line 34, a process similar to that shown in FIGS. 7 to 11 is performed to stack positive electrode sheets 12 and separator sheets 16. After a predetermined number of layers for the battery stack 10 have been stacked, the stacking stage 32 moves to the temporary fastener tape stage 44, and delivers the battery stack 10 to the temporary fastener tape stage 44.

REFERENCE NUMERALS

10 BATTERY STACK
12 POSITIVE ELECTRODE SHEET
14 NEGATIVE ELECTRODE SHEET
16 SEPARATOR SHEET
18 POSITIVE ELECTRODE ACTIVE MATERIAL LAYER
20 POSITIVE ELECTRODE TERMINAL
22 NEGATIVE ELECTRODE ACTIVE MATERIAL LAYER
24 NEGATIVE ELECTRODE TERMINAL
26 TEMPORARY FASTENER TAPE
28A, 28B ELECTRODE TAB
30 LAMINATION DEVICE
32 STACKING STAGE
34 POSITIVE ELECTRODE LINE
36 NEGATIVE ELECTRODE LINE
38 CARRIER HOLDER
40 FIRST CHARGER
42 SECOND CHARGER
44 TEMPORARY FASTENER TAPE STAGE
46 WELDING STAGE
48 POSITIVE ELECTRODE CASSETTE
50 POSITIVE ELECTRODE POSITIONING TABLE
52 POSITIVE ELECTRODE SEPARATOR POSITIONING TABLE
54 SEPARATOR SHEET FEEDER
56 DETECTOR
60 SEPARATOR SHEET CUTTER
64 SHEET ROLL
66 NEGATIVE ELECTRODE CASSETTE
68 NEGATIVE ELECTRODE POSITIONING TABLE
70 NEGATIVE ELECTRODE SEPARATOR POSITIONING TABLE
72 MOVEMENT MECHANISM
74A-74F RETAINER

The invention claimed is:

1. A lamination device for laminating a plurality of sheets to form a stack, the plurality of sheets including a plurality of conductive positive electrode sheets, a plurality of conductive negative electrode sheets, and a plurality of insulating separator sheets, each separator sheet of the plurality of separator sheets being interposed between a positive electrode sheet of the plurality of positive electrode sheets and a negative electrode sheet of the plurality of negative electrode sheets within the stack, the lamination device comprising:

a stacking stage on which the plurality of sheets are stacked to form the stack, the stacking stage being formed of a dielectric;

a movement mechanism configured to move the stacking stage between (a) a negative electrode line, from which the plurality of negative electrode sheets is supplied, and (b) a positive electrode line, from which the plurality of positive electrode sheets is supplied, wherein the plurality of separator sheets is supplied from the negative electrode line, the positive electrode line, or a combination thereof;

a first charger configured to emit charged particles toward the stacking stage, to electrostatically attract the stacking stage to a first sheet of the plurality of sheets, wherein the electrostatic attraction of the stacking stage to the first sheet suppresses positional deviation of the stack with respect to the stacking stage during movement of the stacking stage, and wherein the first charger is configured to emit charged particles toward an uppermost surface of the stack, to electrostatically attract the stack to a next sheet of the plurality of sheets to be stacked on the stack; and a carrier holder configured to move orthogonal to a direction of movement of the stacking stage between the negative electrode line and the positive electrode line, the carrier holder including:

a first retainer configured to carry each negative electrode sheet of the plurality of negative electrode sheets between the negative electrode line and the stacking stage; and a second retainer configured to carry each positive electrode sheet of the plurality of positive electrode sheets between the positive electrode line and the stacking stage, wherein the first charger is connected to the carrier holder, and a length of the first charger in the direction of movement of the stacking stage is at least as long as a travel distance of the stacking stage and a width of one of the positive electrode line and the negative electrode line, in the direction of movement of the stacking stage.

2. The lamination device according to claim 1, wherein:

the positive electrode line includes a positive electrode positioning table configured to position a positive electrode sheet of the plurality of positive electrode sheets, and a positive electrode separator positioning table configured to position a separator sheet of the plurality of separator sheets; and the negative electrode line includes a negative electrode positioning table configured to position a negative electrode sheet of the plurality of negative electrode sheets, and a negative electrode separator positioning table configured to position a separator sheet of the plurality of separator sheets.

3. The lamination device according to claim 2, wherein the carrier holder is configured to carry each of the plurality of separator sheets from either the positive electrode separator positioning table or the negative electrode separator positioning table to the stacking stage, and the carrier holder is further configured to carry each of the plurality of separator sheets with a lower surface that faces an uppermost surface of the stack, the lamination device further comprising:
  a second charger below the carrier holder configured to emit charged particles toward the lower surface of each of the plurality of separator sheets carried by the carrier holder as each of the plurality of separator sheets passes over the second charger.

4. The lamination device according to claim 2, further comprising a temporary fastener tape stage configured to affix a temporary fastener tape to an outermost perimeter of the stack, wherein
  the movement mechanism is configured to move the stacking stage from either the positive electrode line or the negative electrode line to the temporary fastener tape stage.

5. The lamination device according to claim 4, further comprising a welding stage configured to weld an electrode tab to each of a plurality of positive electrode terminals and a plurality of negative electrode terminals of the stack to which the temporary fastener tape is affixed.

6. The lamination device according to claim 2, wherein the carrier holder further includes:
  a third retainer configured to carry each negative electrode sheet of the plurality of negative electrode sheets between a negative electrode cassette and the negative electrode positioning table; and
  a fourth retainer configured to carry each positive electrode sheet of the plurality of positive electrode sheets between a positive electrode cassette and the positive electrode positioning table,
  wherein the first retainer is configured to carry each negative electrode sheet of the plurality of negative electrode sheets between the negative electrode positioning table and the stacking stage, and the second retainer is configured to carry each positive electrode sheet of the plurality of positive electrode sheets between the positive electrode positioning table and the stacking stage.

7. The lamination device according to claim 1, wherein the uppermost surface of the stack is a positive electrode sheet of the plurality of positive electrode sheets, a negative electrode sheet of the plurality of negative electrode sheets, or a separator sheet of the plurality of separator sheets.

8. The lamination device according to claim 1, wherein the first charger emits the charged particles toward the stacking stage, to electrostatically attract the stacking stage to the first sheet of the plurality of sheets, before the first sheet of the plurality of sheets is placed on the stacking stage.

9. The lamination device according to claim 1, where the first charger reciprocates over the stacking stage based on the movement of the carrier holder relative to the stacking stage.

10. The lamination device according to claim 3, wherein the carrier holder is configured to move orthogonal to a length of the second charger in the direction of movement of the stacking stage.

11. The lamination device according to claim 1, wherein the first charger spans the stacking stage aligned with the negative electrode line and the stacking stage aligned with the positive electrode line.

* * * * *